PRODUCTION OF TORQUE YARN

Original Filed June 28, 1968 2 Sheets-Sheet 1

INVENTOR.
CHARLES M. RICE
BY
Francis W. Young
ATTORNEY

PRODUCTION OF TORQUE YARN

Original Filed June 28, 1968 2 Sheets-Sheet 2

INVENTOR.
CHARLES M. RICE
BY Francis W. Young
ATTORNEY

United States Patent Office

Re. 28,117
Reissued Aug. 13, 1974

28,117
PRODUCTION OF TORQUE YARN

Charles M. Price, Candler, N.C., assignor to Akzona Incorporated, Asheville, N.C.

Original No. 3,559,391, dated Feb. 2, 1971, Ser. No. 740,869, June 28, 1968. Application for reissue Oct. 14, 1971, Ser. No. 189,276
Int. Cl. D02g *1/02, 1/08*
U.S. Cl. 57—34 HS 16 Claims

Matter enclosed in heavy brackets [ ] appears in the original patent but forms no part of this reissue specification; matter printed in italics indicates the additions made by reissue.

ABSTRACT OF THE DISCLOSURE

A treating system is disclosed for creating torque in running lengths of continuous filament or spun yarn. In a preferred embodiment, the yarn is elongated simultaneously with the torque producing operation. The treating system utilizes a conical yarn-driven idler roller which serves at least three functions, e.g., separates convolutions of yarn, derives energy from a motor-driven roller, and twists yarn passing over the conical portion to produce torque. The torque may be set by any desired means.

Figure 1:
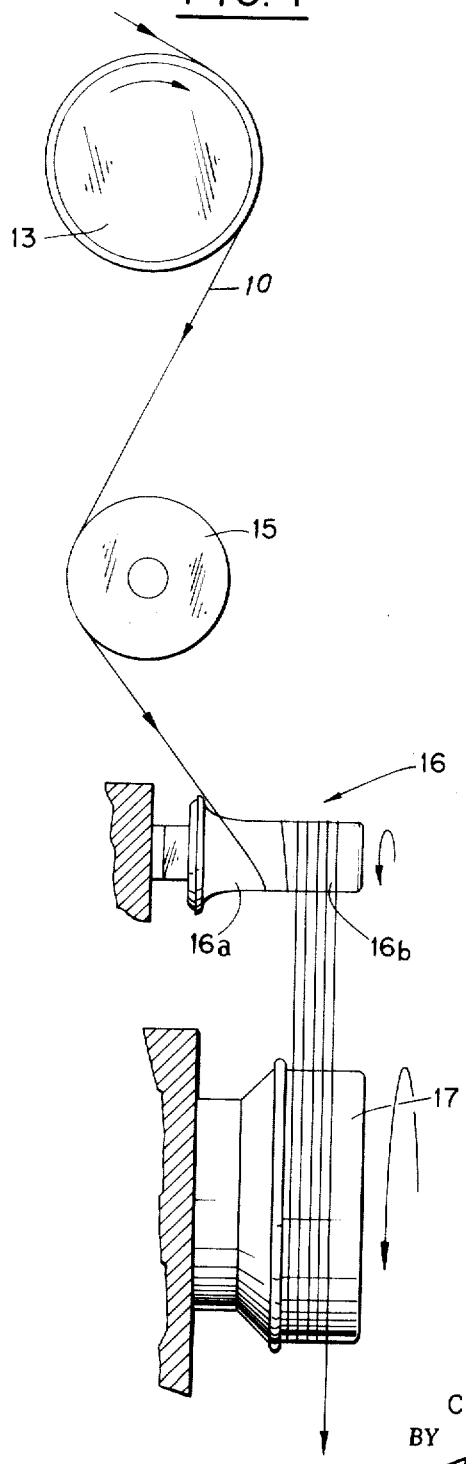

This invention relates generally to a method and an apparatus for imparting torque to thermoplastic textile materials such as continuous monofilament, continuous multifilament, or spun yarn. More specifically, the present invention relates to improvements in an apparatus for and a method of producing a high degree of torque in yarns such as those produced from synthetic thermoplastic polyamides, polyesters and the like.

The term "torque yarn" is hereinafter referred to as being the textile product of the invention and is defined as a yarn product having a tendency to twist about its longitudinal axis. This tendency is obtained after twisting according to the method of the invention, heating or otherwise setting the yarn when in a highly twisted configuration, and subsequent cooling before the twist is released. Although the features to be described hereinafter are equally applicable to a yarn composed of spun fibers ("spun yarn"), this invention is believed to have more immediate utility in the field of continuous filament yarn formed from synthetic material having thermoplastic properties. Moreover, although a heat setting operation will be described in detail, it should be understood that chemical setting of twist, or some other form, might be desired in tthe treatment of spun yarn. For illustrative purposes, this description will be limited to continuous filament yarns formed from thermoplastic material.

According to the present invention, synthetic thermoplastic yarn is passed one or more helical wraps about a yarn-driven, or freely rotatable, idler roller having a first section comprising a surface (such as a frustum) angularly disposed in regard to its axis of rotation and a second section having a surface which is substantially parallel to the roller axis. This invention may with advantage be adopted by yarn producers for use on existing yarn processing equipment, such as conventional winders or twisters. In either event, it distinguishes over known discontinuous torque-producing methods that operate at low yarn speeds and which for the most part must start with previously drawn or oriented, prepackaged yarns. Also, very expensive apparatus of a complicated nature is generally required in these discontinuous torque-producing systems.

THE PRIOR ART

As is well-known, synthetic thermoplastic textile materials such as nylon and polyester are capable of being heat set to a degree sufficient to obtain stretchable yarn, for example, that of the "false-twist" variety. Such yarn is usually prepared by a time-consuming stepwise (batch) operation during which continuous, thermoplastic yarn is first stretched (drawn or molecularly oriented), lightly twisted, and then collected. Drawing consists of stretching the yarn several times its original length, in order to obtain acceptable tenacity, and winding into package form. Thereafter the packaged yarns must be unwound, highly twisted, heat set, untwisted, and then repackaged. The most time-consuming operation is in the twisting step. Known twisting procedures depend on spindles rotating at very high speeds, and because of the limiting effects of friction, centrifugal force and the like, such processing is very expensive, adding considerably to the cost of the stretchable textile product obtained—notwithstanding the fact that the additional handling required thereby often results in yarn of reduced quality and uniformity.

Commonly assigned U.S. patent application Ser. No. 395,997, filed Sept. 14, 1964, now Pat. No. 3,435,607, in the names of Virgina S. Bowers et al., discloses a method adaptable to well-known, commercial drawtwisting equipment for inserting a high degree of torque in freshly drawn thermoplastic yarn. The process of the application "strips back" and heat sets a false twist imparted during traveller rotation on a conventional drawtwisting machine. Torque yarn is produced by this accumulation of torsional forces which is capable of being manufactured into textile materials having an excellent elastic nature. Uniform torque characteristics are found in the yarn which can be favorably compared to that obtained when using the more expensive, multi-step, twisting methods with false twist spindles. Thus, and in complete contradistinction to methods now used conventionally, i.e., the false twisting and other methods, the Bowers et al. application is concerned with an improved method and apparatus wherein torque or a tendency of the yarn to torque is imparted while it is being processed by slightly modifying existing drawtwisting apparatus. While certainly being useful on drawtwisters, as will appear, the present invention is not restricted to such use and may, for example, be applied to twisters, drawwinders, or to other winding equipment.

It is known to twist thermoplastic yarn by pulling it angularly around the surface of a rotating roll or conveyor. In British Pat. 801,464, German patent application 1,898,540 (Registered Design application GM. 639 published Aug. 13, 1964), commonly assigned U.S. Pat. 2,943,433, U.S. Pat. 3,094,834, and more recently in U.S. Pat. 3,327,461, it is shown that thermoplastic continuous filament yarn can be crimped or curled by imparting heat-settable twist to a running yarn comprising passing the yarn across and in frictional contact with the outer surface of a mechanically (motor) driven rotating body such as a driven roll, plural rolls, endless bands or belts, and the like. In the preferred aspects of the methods taught in the patents, rotary movement of the body is imparted to the yarn passing thereover to accumulate twist along the longitudinal axis of the yarn. The twist of course is heat set to produce torque yarn.

For example, British Pat. 801,464 describes passing the yarn across and in frictional contact with an angularly disposed endless belt or band. The endless band is motor driven to pass at an angle to the yarn line of travel. The yarn to be twisted is urged against the band by suitable positioning guides on each side and in the general direction of the line of travel.

The false twist imparting device disclosed in U.S. Pat. 2,943,433 utilizes two rotatably mounted, motor driven rollers in the form of hyperboloids which cooperate with each other to create heat-settable twist in a running length of yarn.

A motor driven drawn roll provided with a flange which rapidly rotates the yarn is described in U.S. Pat. 3,094,-834. The yarn rubs against the flange as it approaches the draw roll and this action causes the yarn to rotate about its longitudinal axis.

According to German application 1,898,540 and U.S. Pat. 3,327,461, multifilament yarns are led over and around one or several angularly positioned rotating rollers which are also motor driven. The rollers are positioned in an angular relationship in regard to the direction in which the yarn travels thereover. Although U.S. Pat. 3,327,461 suggests that the twist imparting roller may be yarn driven, the thread-up scheme described permits only a partial wrap of yarn on the roller and the frictional forces developed undoubtedly are insufficient to produce both roller rotation and yarn twist, as patentee states that the motor-driven roller system is preferred.

It is also known, of course, to twist filaments and yarns while drawing. This is exemplified by British Pat. No. 815,202. It is important to note, however, that in this patent a precision tube-type false-twisting device is used. Also, the drawn and twisted yarn is collected in skein form, which, unlike the present system, evidences the need for additional treatment.

It should be noted that applicant's method and apparatus are far less complicated than those that are known. For example, in the false twisting method, the hollow spindle must rotate at about 50,000 r.p.m. or higher in order to put a sufficient number of turns of twist per unit length in a yarn running at commercially acceptable speeds. As is known, the degree of torque imparted to the yarn is a function of the twist present at the time the twist is set and it is apparent that the speed at which the process can be performed continuously is a function of how fast the twist can be inserted. Higher yarn speeds during twisting are difficult to achieve due to the excessive speed demands which they make on the bearings of the spindles used for inserting the twist.

Apparatus heretofore used in lieu of high speed spindles, such as belts and rollers, are theoretically promising but in practice they are found to be quite difficult to build, service, and maintain. Also, these rollers and belts have required motor drives which consume space and add to the expense of production. The conical yarn driven roller of this invention is believed to have innumerable advantages over cylindrical rollers whether motor driven or yarn driven. For example, a cylindrical roller discharges yarn at the same angle at which it is received. See, for example, aforesaid U.S. Pat. No. 3,327,-461. With a conical roller, however, the yarn may be discharged perpendicular to the axis of rotation, regardless of the angle of approach, thus eliminating the need for special guides which would be undesirable because of their adverse effect on the freshly heat-set yarn. Moreover, more than one twisting wrap can be accommodated on a conical roller as distinguished from a cylindrical roller and this of course maintains twist in the yarn over an extended distance, gives the yarn additional time for cooling after heat setting, and thereby produces a more uniform product.

With a cylindrical roller a plurality of wraps added for increasing the twist function results in decreasing the angle between yarn entering the roller and the axis of roller rotation. This is undesirable because of a concomitant decrease in twisting effect. On the contrary, however, a conical roller increases the angle between the yarn entering the roller and the roller axis of rotation to produce a higher degree of twist.

When yarn enters the large diameter portion of a conical roller and leaves on the small diameter portion of the roller, as described herein, a high tension results as the yarn comes onto the roller and a low tension occurs in the yarn discharging from the roller. This phenomenon is desirable, i.e., a low discharge tension is desired because there is still heat in the freshly heat-set yarn and any disturbances produced by high tension of unnecessary contact with guides would stretch out some of the twist which had been previously set. Insofar as known, these advantages are not obtained with the prior art torque setting systems.

Accordingly, it is an object of this invention to provide a process and apparatus for producing quality torque yarns at low rotational speeds of the twisting elements.

A further object is to provide an apparatus for producing torque yarns using as an essential twisting component a freely rotatable roller having a twist imparting surface and a driven end adapted for rotation solely by the frictional engagement of one or more parallel wraps of the yarn being processed.

Another object of this invention is to provide a freely rotatable yarn twisting roller having a surface configuration which serves to separate convolutions of yarn passing thereover and which also serves to rotate the same yarn about its longitudinal axis.

Still another object of the invention is to provide a freely rotatable twisting means which can be used in conjunction with a motor-driven roll or godet on yarn conveying and/or treating apparatus.

An additional object of the present invention is to provide a conical yarn-driven roller which serves at least the function of separating multiple convolutions of yarn being forwarded by a motor-driven roller, of deriving energy from the motor-driven roller, and of rotating the yarn passing thereover about its longitudinal axis to impart twist thereto.

Still an additional object of this invention is to provide a yarn separator roller for a drawtwister machine which will serve to impart twist to yarn passing thereover without the addition of a motor drive.

These and other objects will become more apparent from the following detailed description.

In accordance with the present invention, yarn is urged across the surface of a freely rotatable idler (yarn driven) roller mounted substantially perpendicular to a supporting surface in contradistinction to prior art rollers having the roller axis angularly disposed or off-set in regard to other machine elements. The freely rotatable roller has two yarn contacting sections. The first of said sections has a surface configuration designed to impart optimum helical twist characteristics to the yarn upstream between the freely rotatable roller and a twist-setting means, and also to allow the roller to receive and release the yarn in the proper direction of travel so that additional guiding surfaces are not required. The second section has a surface configuration necessary to separate yarn convolutions so that a sufficient number of wraps may be made to drive the roller without yarn slippage at a surface speed equal to the speed at which the yarn is moving. Optimum rotation is obtained by frictional engagement between the yarn and the second section of the roller. The first section of the freely rotatable roller decreases in diameter gradually so that it presents a peripheral surface having a contour of varying diameter and, accordingly, is hereinafter referred to as the tapered peripheral twisting surface or merely the tapered surface.

The configuration or the contour of the roller periphery allows the yarn to make initial contact with the first section obliquely to its direction of rotation and leave the tapered end perpendicular to the roller axis of rotation. This permits mounting of the twist roller parallel, or nearly parallel, to a larger, motor driven, yarn transporting godet so that the twist roller may receive its driving force from a plurality of parallel wraps traversing the godet and the second (driving end) surface.

The concave contour of the tapered twisting section preferred according to the invention constitutes the twisting section and is defined by a curved line connecting the points at which the yarn makes and breaks contact therewith. The yarn traverses the tapered concave section angularly (obliquely) and leaves the roller substantially perpendicular to the axis at the driving end thereof, i.e., the second cylindrical surface which, throughout its length, is substantially parallel to the roller axis.

The number of turns per inch of twist introduced into the yarn per unit length is determined by the angle of the yarn on the tapered first section, the coefficient of friction of the surface, and the relative speed between yarn and roller. In order to obtain maximum twist in the yarn, it is preferred that the yarn initially slant across the surface of the first section at an angle preferably between 30° and 45° (in regard to the roller axis). A twist of lesser degree can be provided in the yarn if the approach angle of the initial wrap is increased. Further, the greater the diameter of the tapered section as compared to the driving section, the higher the maximum peripheral speed where it makes contact with the yarn and consequently the greater the possible degree of twist.

The diameter of the second section (the driving end) of the roller is substantially constant along the length of its axis, and the departure angle of yarn leaving the first section is substantially parallel to the subsequent wraps on the second section. The total angle of contact or wrap of the yarn around the contour of the tapered section should be at least 360° as viewed looking along the roller axis. For drive purposes, it is also necessary for a number of wraps of the yarn to lie substantially parallel and frictionally engage a portion of the second cylindrical surface.

Once the full level of twist is built into the yarn upstream of the roller, the total number of the twist in the yarn remains substantially constant. The twist level, as measured in turns per inch, is influenced by such variables as heater temperature, angle of yarn on the twist roller, and type of roller surface, but once the state of these variables has been selected and fixed, the system operates in a stable manner and is capable of yielding a uniform product. Thus, the first surface section of the roller acts to impart twist and the heating means acts as a twist stop in the region where the yarn breaks contact with or discharges from the heating means. The twist is fixed by the cooling action which occurs after the yarn has left the heater but while it is still twisted, that is, between the point at which it leaves the heater and the point at which it leaves the first surface section of the roller. In a preferred embodiment, torque yarn is prepared during stretching by subjecting substantially untwisted and undrawn feeder yarn to the steps of this invention.

Figure 2:
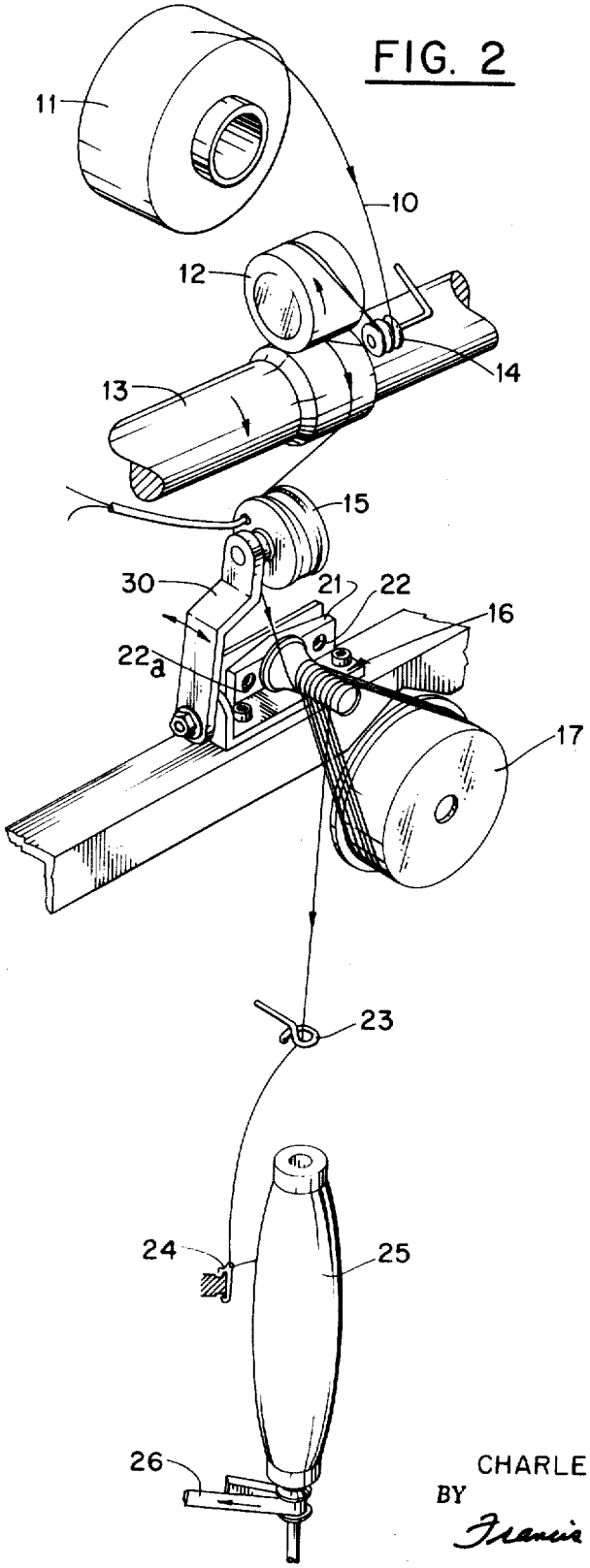

Other objects and advantages of this invention will be apparent from the following detailed description taken in conjunction with the accompanying drawings wherein:

FIG. 1 is an elevational view, in detail, of apparatus utilizing the concepts of this invention; and FIG. 2 is a perspective view of this invention added to a draw twisting machine.

In the following description, the term "twist" refers to twist which has been set in the yarn by the method of the invention. Although the twist is not readily visible by examination when the yarn is under tension, relaxation thereof will cause contortion, twisting and snarling about the longitudinal axis of the yarn. The term "heat setting" or "setting" refers to heating of the yarn (plasticization) followed by cooling (quenching) an amount sufficient to fix the configuration assumed by the yarn while hot. The yarn retains a memory of the heated configuration and tends to return to it when relaxed. Chemical setting of course could be used under certain circumstances instead of heat setting, as explained earlier.

Yarn 10, which may be nylon, polyester or other continuous filament synthetic linear high polymers, or which may be "spun" fibers as indicated above, is fed from a yarn package 11 (FIG. 2) by feed rollers 12 and 13 over stationary guide 14. From this guide, the yarn is passed to heating means 15, freely rotatable twisting and separating roller 16, to driven roller or godet 17, and finally to wind-up package 25. The package 25 is rotated by drive belt 26. The feed roller 13 and draw roller 17 are rotated by conventional gearing and drive shafts, not shown.

In the preferred embodiment of FIGS. 1 and 2, yarn 10 entering the treating zone has not been drawn or attenuated (stretched several times its length in order to orient the molecules) but has been collected in an undrawn condition as represented by its initial take-up package 11. While this invention may be practiced with yarn which has previously been drawn, it should be noted that considerably improved results are obtained not only in torque properties of the yarn but also in uniformity of appearance and hand of the finished product by simultaneously drawing and torque setting in the manner to be described.

The high level of twist according to the present invention results from the frictional forces between yarn 10 and the tapered freely rotatable roller 16 and the twist is concentrated essentially in the zone between the roller and heating means 15. Theoretically, rotation of the roller 16 would tend to introduce a force which in the absence of an opposite force would cause the incoming end to collect—after initially following a helical path on concave surface section 16a—around the cylindrical surface 16b of the roller. The yarn, however, is prevented from collecting by the downward force exerted through draw godet 17. So long as the process is not disturbed, the twist is confined to the plasticized yarn extending between the heated pin 15 and tapered section 16a, thereby resulting in the trapping or impounding of the twist upstream of the freely rotatable tapered first section.

Equilibrium is reached when a new twist is introduced just below heating means 15 and a corresponding twist disappears as the yarn leaves tapered section 16a of the roller. As soon as the equilibrium condition is established in a given running length of yarn, further twist will not be accumulated in the twist zone between the heater and roller because the torque required to impart such additional twist will overcome the frictional resistance existing between the yarn and roller.

Mounting freely rotatable tapered (twisting) roller 16 substantially perpendicular to its supporting surface may be accomplished by any suitable means. In FIG. 2 the roller is mounted on a nonrotating shaft which is attached at its support end through pivotable plate 21. The plate permits altering the position of the shaft (skewing) and, accordingly, the axis of roller 16 with reference to the driven roller 17 to separate convolutions of the yarn either on driven roller 17 or surface sections 16a and 16b.

Pivotal movement of nonrotating support shaft 21 is permitted through set screws 22 and 22a. Suitable bearings (not shown) are journalled on the shaft within the hollow freely rotatable roller 16.

Electrically heated pin 15 can be mounted for inward and outward movement in the direction of the arrow by arm 30. Thus, adjustable arm 30 can be used to control the approach angle, that is, the angle at which the yarn approaches the axis of the tapered roller 16. The approach angle also may be controlled by suitably guiding the yarn but contact between the freshly twisted and heated yarn and guide surfaces is not desired, as indicated earlier.

The operation of the preferred apparatus will now be described.

Undrawn synthetic yarn 10, for example nylon or polyethylene terephthalate, is removed from supply package 11 (FIG. 2 only) by roller 12 and driven roller 13 of, for example, a drawtwisting machine although, as stated previously, the invention may be practiced with yarn which has been previously drawn. Considerably improved results are obtained not only in torque properties of the yarn but also in uniformity of appearance in hand of the finished product by simultaneously drawing and torque setting by the method of this embodiment of the invention; however, and, accordingly, this is the preferred embodiment.

Godet 17 is driven at a speed higher than that of cooperating feed rollers 12 and 13 and functions in a normal manner to stretch the yarn to improve its physical properties. Heated pin 15 serves to localize the draw points by its snubbing and heating effects.

As in a normal drawtwisting operation, drawn yarn is fed directly through pigtail guide 23 and traveller 24 onto package 25 which is driven through a spindle hub and the drive belt 26. In the experiments to be described presently, it has been determined that the yarn extending between the tapered twist roller 16 and electrically heated pin 15 contains a high degree of twist. Utilization of this twist is necessary to proper realization of the objects of the invention.

Any suitable external heat source may be employed for heating the yarn to essentially its plasticization temperature. For example, the yarn may pass one or more times around the electrically heated pin shown or the yarn may be caused to run over a heated plate. Other suitable heating means are steam, infrared lamps, radiant heaters, molten metal, a high frequency electrical field, etc. The temperature of the heating means chosen must not be so high as to melt the yarn, however.

The direction of the twist ("S" or "Z") imparted by tapered roller 16 depends on the direction in which the yarn is wound with respect to the axis of the tapered roller. In the thread-up shown, an "S" twist will be produced; the mirror image of the thread-up shown will produce a "Z" twist.

Cooling occurs between the heating means and the yarn driven idler roller 16. The optimum amount of cooling is that in which the yarn temperature drops below the plasticization or transition point before the twist is removed.

Collection of the yarn may comprise the conventional wind-up assemblies, including a downtwister or reciprocating traverse winder. In the case where the take-up means is a twisting take-up, it is preferred that the direction of the twist imparted to the yarn at the wind-up be in the opposite direction from that being developed upstream from the tapered twisting roller.

The following examples illustrate various embodiments of the process of this invention. The procedure used for determining torque for the various examples is as follows. Commercially available microbalance meters are suitable for electrically determining the amount of torque in structures such as the synthetic yarns being processed according to the invention. For example. Cahn Instrument Company of Fairmont, Calif., manufactures an electrobalance (TM) meter which may be converted for attaching one end of torque yarn to an indicating needle and for fixing the other end of yarn against rotation. Any torque present in the yarn function to deflect the needle from a zero or normal position. Upon application of current through a needle associated coil, the yarn torque may be overcome and the needle returned to the zero position. The amount of current applied to re-zero the needle is directly proportional to the amount of torque present in the sample being tested. Since the meter or needle is balanced in each test to the same zero position, any uneven magnetic field effects about the needle axis are eliminated.

In all of the examples, "torque level" values actually represent current readings in microamps. If desired, these values may be converted to torque in milligrams-centimeters upon multiplication by a factor of 0.15. The figures are used, however, merely to show relative torque levels of the product of this invention and of conventional false twisted yarn and have not been converted to the more accurate nomenclature usually associated with torque. Each "torque level" reading reported hereinbelow was obtained by folding a one-meter strand of yarn into a loop and then by holding one portion of the loop fixed while attaching the opposite loop portion to a meter needle such as described above. All samples were prepared and tested in the same manner.

Yarn processed by conventional, tube-type, discontinuous false twist equipment has been compared with yarn processed by the present invention. The torque levels obtained appear hereinbelow in tabular form.

The apparatus used in the runs illustrating the invention is shown in FIGS. 1 and 2. The heated pin 15 was composed of a ceramic coated metal such as a metallic oxide, i.e., aluminum oxide or titanium oxide, bonded to a suitable metal substrate such as copper. The freely rotatable tapered twisting roller 16 can be of polished chrome or stainless steel, i.e., it may be ground down substantially smooth. It also may be of a rough surface along its entire length; or, if desired, the surface may be partially smooth, or rough either at the first tapered section or the second driving section. Godet 17 may also be of polished chrome.

TABLE

| Run | Yarn, den./fil. (as drawn) | Process [1] | Pin temp. (° C.) | Yarn speed (ft./min.) | Draw ratio | Torque level |
|---|---|---|---|---|---|---|
| 1 | 15/1 | A | 170-175 | 300-400 | None | 25 |
| 2 | 15/1 | B | 180 | 2285 | 3.32 | 30 |
| 3 | 20/1 | A | 170-175 | 300-400 | None | 39 |
| 4 | 20/1 | B | 180 | 2285 | 3.67 | 40 |

[1] A = Discontinuous false twist process; B = Process of the invention.

It is apparent from the table that high levels of twist are imparted at high running speeds according to the process of the invention. Furthermore, the torque level obained with the system of the invention, at least in the samples tested, exceeds the torque level of yarn produced by conventional discontinuous processes. Upon inspection it has been found that the fabric obtained from yarn twisted according to this invention has a hand and appearance which compares favorably to fabric made from false twisted yarn prepared by conventional discontinuous processes. The elongation and elasticity of the yarn, as well as the hand and appearance of fabric made therefrom, for example, hosiery, compares favorably with that of any of the known methods. Hosiery produced with the yarn processed as described herein has sufficient resiliency to ensure a snug and comfortable fit and pleasing appearance. All the advantages are obtained with the present invention by providing apparatus in the simplest form, i.e., a tapered yarn-driven idler roller, for use on existing equipment including yarn forwarding means, heating means, the driving roller and a yarn take-up. Hence, it is apparent that the invention requires nominal expenditure when compared to the cost of false twisting spindles, as well as the additional operating steps previously required.

It should be noted from the table that yarn processed according to this invention was simultaneously drawn and torque set. In contrast, the discontinuous system involved the torque setting of yarn which had been drawn on a previous occasion. While improvement in torque level shown in runs 2 and 4 may be due primarily to the difference in twisting operations per se, it is believed that the simultaneous drawing and twisting of this invention contributed substantially to this difference.

Although the twisting portion **16*a* of freely rotatable roller 16** has been shown and described as being concave, other curvatures are possible. For example, a convex curvature or a conical shape may be more desired under certain circumstances. In any case, however, the enlarged portion performs a significant function of rotating yarn about its longitudinal axis at a speed greater than that which would occur if only a cylindrical roller were utilized.

The set screws 22 and 22a are adjusted so that the axis of idler roller 16 is skewed very slightly with regard to the axis of drive roller 17. This is a common expedient and assures that the convolutions of yarn passing between the drive and driven rollers will be maintained separate one from the other. It will be seen, therefore, that roller 16 performs the function required of conventional separator rollers and, in addition, derives rotational energy at drive end 16b from the drive roller 17 in a sufficient amount to propel the twist end 16a to rotate yarn longitudinally about its axis.

What is claimed is:

1. In an apparatus for the production of torque yarn including a yarn supply, twisting means, and means for collecting said yarn, the improvement in the twisting means comprising a freely rotatable yarn driven roller having a cylindrical yarn driven end and a tapered yarn twist end for imparting twist to said yarn; and means for directing said yarn from said yarn supply to said tapered yarn twist end at an angle oblique to the axis of said roller, said tapered yarn end having peripheral surface means for engaging the yarn at a total angular yarn contact of at least 360° whereby a more uniform torque yarn is obtained.

2. An apparatus as set forth in claim 1 wherein the tapered portion of said roller is concave.

3. An apparatus as set forth in claim 1 wherein the tapered portion of said roller is a frustum and the peripheral speed of the frustum is greater than the speed of the yarn.

4. In an apparatus for the production of torque yarn including a yarn feeding roller, yarn heating means, and a yarn drawing roller, the improvement comprising a freely rotatable yarn driven separator roller having a cylindrical portion extending from one end to substantially the midpoint which cooperates with said yarn drawing roller to separate convolutions of yarn passing over said yarn drawing roller and having a tapered portion enlarged outwardly from the midpoint to the other end of said separator roller to rotate said yarn about its longitudinal axis in order to impart twist in the portion of the yarn passing over said tapered portion from said yarn heating means; and said yarn heating means including means for directing said yarn from said yarn feeding roller to said tapered portion at an angle oblique to the axis of said separator roller, said tapered portion having peripheral surface means for engaging the yarn at a total angular yarn contact of at least 360° whereby a more uniform torque yarn is obtained.

5. An apparatus as set forth in claim 4 wherein said tapered portion is concave.

6. An apparatus as set forth in claim 4 wherein said tapered portion is a frustum.

7. Apparatus for treating thermoplastic yarn comprising a yarn treating means, a yarn feed roller for supplying yarn to said yarn treating means at a first rate of speed; a yarn draw roller for withdrawing yarn from said yarn treating means at a second rate of speed substantially higher than the first rate; said yarn treating means including a freely rotatable yarn driven roller about which said yarn is wrapped between said yarn feed roller and said draw roller for twisting said yarn, said freely rotatable roller having a tapered portion at one end for imparting twist to said yarn and having a cylindrical portion at the other end for maintaining separate convolutions of yarn passing over said yarn draw roller; means for directing said yarn from said yarn feed roller to said tapered portion at an angle oblique to the axis of said yarn driven roller, said tapered portion having peripheral surface means for engaging the yarn at a total angular yarn contact of at least 360° to provide a more uniform torque yarn; and means for setting the twist imparted by the tapered portion of said freely rotatable roller.

8. A method of producing torque yarn comprising the steps of feeding thermoplastic yarn to a twist setting zone; passing the yarn from the twist setting zone to a tapered portion of a separator roller, traversing and engaging the tapered portion of said roller with said yarn at an angle oblique to the axis of said roller and at a total angle of yarn contact of at least 360°, passing the yarn from said tapered portion over a cylindrical portion of said separator roller, deriving rotational energy from passage of the yarn over the cylindrical portion, utilizing said derived energy to rotate the roller and consequently the yarn in contact with the tapered portion of said roller to impart a twist to the yarn and setting the twist thus imparted to said yarn.

9. A method of producing torque yarn comprising the steps of feeding undrawn thermoplastic yarn to a twist setting zone, drawing the yarn in said twist setting zone, passing the yarn from said twist setting zone to a tapered portion of a separator roller, traversing and engaging the tapered portion of said roller with said yarn at an angle oblique to the axis of said roller and at a total angle of yarn contact of at least 360°, passing the yarn from said tapered portion over a cylindrical portion of said separator roller, deriving rotational energy from passage of the yarn over the cylindrical portion, utilizing said derived energy to rotate the roller and consequently the yarn in contact with the tapered portion of said roller to impart a twist to the yarn, and heat setting the twist thus imparted to said yarn.

*10. An apparatus for drawing and texturing thermoplastic textile yarn, including a feed roller and draw roller rotatable at a higher surface speed for stretching yarn passing between the feed roller and draw roller, the improvement comprising a yarn driven separator roller adjacent to and associated with the draw roller for initially receiving yarn from the feed roller, the separator roller having a flange with a peripheral surface for frictionally contacting the initial yarn wrap as it passes onto the separator roller from the feed roller, the remainder of said separator roller having a yarn contacting surface substantially parallel to the axis of rotation of the separator roller for spacing subsequent wraps of yarn on the draw roller, and means for heating the yarn before it passes to the separator roller flange.*

*11. The apparatus of claim 10, including means for supplying yarn to the feed roller and means for collecting the yarn from the draw roller.*

*12. The apparatus of claim 10 wherein the axis of rotation of the separator roller is substantially parallel with the axis of rotation of the draw roller.*

*13. The apparatus of claim 10 wherein the yarn path of travel initially slants at an angle between 30° and 45° to the separator roller axis upon contact with the flange surface.*

*14. The apparatus of claim 10 wherein the yarn contacting surface of the separator roller flange is tapered to the remaining yarn contacting surface of the separator roller.*

*15. The apparatus of claim 14 wherein said tapered surface is concave.*

*16. A drawtexturing apparatus for textile denier thermoplastic yarn, comprising feed means for non-drawn yarn including a feed roller and supply source; a draw roller for stretching yarn passing from the feed roller; a yarn driven separator roller adjacent to and associated with the draw roller for initially receiving yarn from the feed roller and having a flange with a tapered concave peripheral surface for frictionally contacting the initial yarn wrap as it passes onto the separator roller, the remainder of the separator roller yarn contacting surface being substantially parallel to the axis of rotation of the separator roller for spacing subsequent wraps of yarn on the draw roller; means for heating the yarn before it*

*passes to the separator roller; and means for collecting the yarn from the draw roller.*

References Cited

The following references, cited by the Examiner, are of record in the patented file of this patent of the original patent.

UNITED STATES PATENTS

| | | | |
|---|---|---|---|
| 2,952,964 | 9/1960 | Gonsalves et al. | 57—34 H S |
| 3,161,706 | 12/1964 | Peters, Jr. | 57—77.4 X |
| 3,327,461 | 6/1967 | Wyatt | 57—34 H S |

| | | | |
|---|---|---|---|
| 2,410,419 | 11/1946 | Belleza, Jr. | 57—77.4 |
| 3,094,834 | 6/1963 | Deeley et al. | 57—55.5 |

FOREIGN PATENTS

| | | | |
|---|---|---|---|
| 1,098,545 | 1/1968 | Great Britain | 57—34 H S |

JOHN PETRAKES, Primary Examiner

U.S. Cl. X.R.

57—77.4, 157 S, 157 T S